United States Patent [19]

Hehl

[11] 4,278,354
[45] Jul. 14, 1981

[54] INJECTION UNIT WITH ADJUSTABLE PLASTIFICATION CYLINDER

[76] Inventor: Karl Hehl, Arthur-Hehl-Strasse 32, 7298 Lossburg 1, Fed. Rep. of Germany

[21] Appl. No.: 124,847

[22] Filed: Feb. 26, 1980

[30] Foreign Application Priority Data

Feb. 27, 1979 [DE] Fed. Rep. of Germany ....... 2907557

[51] Int. Cl.³ .............................................. B29B 1/06
[52] U.S. Cl. ...................................... 366/78; 366/79; 425/558; 425/561
[58] Field of Search .................. 366/78, 79, 289, 318; 425/558, 561

[56] References Cited

U.S. PATENT DOCUMENTS

| | | |
|---|---|---|
| 2,916,770 | 12/1959 | Lemoine ............................ 425/561 |
| 3,169,275 | 2/1965 | Compton et al. ...................... 366/78 |
| 3,738,618 | 6/1973 | Hehl ..................................... 366/79 |
| 3,806,294 | 4/1974 | Hehl .................................. 366/79 X |
| 3,887,170 | 6/1975 | Heindl ................................. 366/78 |

Primary Examiner—Philip R. Coe
Attorney, Agent, or Firm—Joseph A. Geiger

[57] ABSTRACT

An improved injection unit for a plastic materials injection molding machine, having a plastification cylinder and a cooperating rotatable and axially movable plastification screw, both supported and guided on tie rods by means of a carrier bridge, the plastification cylinder being axially adjustable and clampable in relation to the carrier bridge by means of a threaded adjustment nut cooperating with a threaded end portion of the plastification cylinder and a central threaded clamping sleeve cooperating with a stationary thrust plate, the latter being permanently secured to the carrier bridge.

8 Claims, 5 Drawing Figures

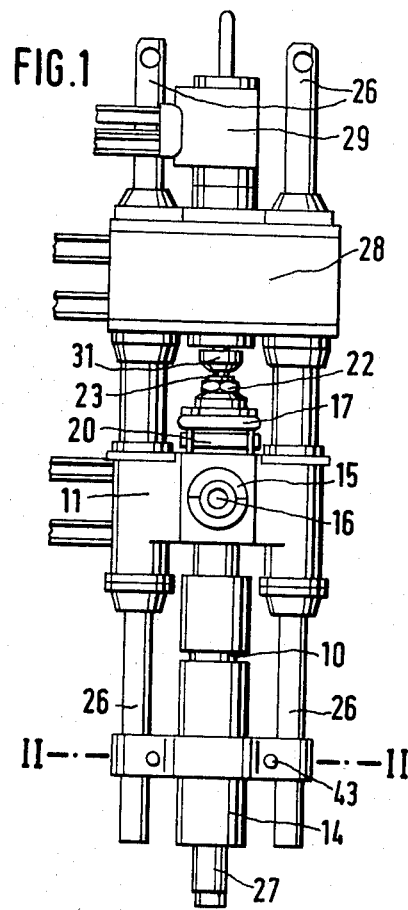
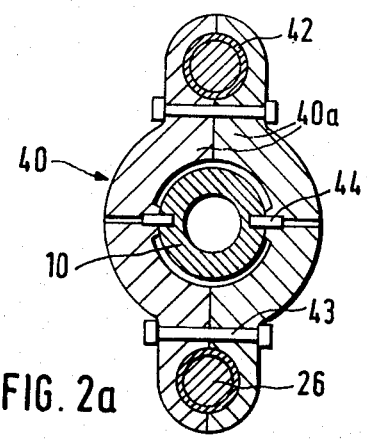
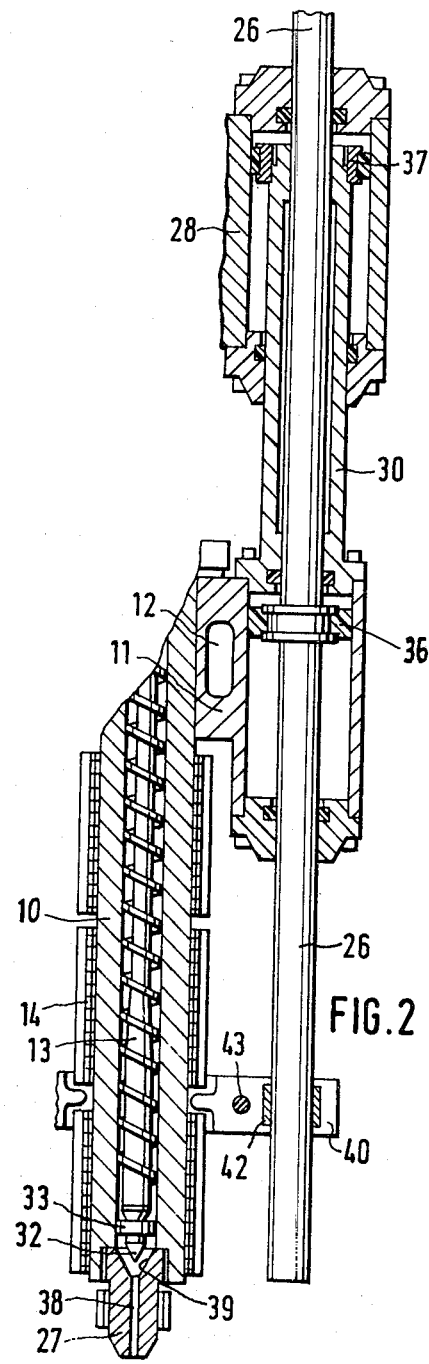

INJECTION UNIT WITH ADJUSTABLE PLASTIFICATION CYLINDER

BACKGROUND OF THE INVENTION

1. Field of the Invention

The present invention relates to injection molding machines and, more particularly, to an injection unit of the type which has a plastification cylinder and a cooperating plastification screw which, after plastification of a charge, is forcibly advanced inside the plastification cylinder, thereby injecting the charge of plastic raw material into an injection molding die.

2. Description of the Prior Art

Injection units of the type under consideration commonly have two parallel tie rods of which one extremity is attached to the die closing unit of the injection molding machine and the opposite extremity is free or supported on the machine base. The two tie rods not only serve as a support for the injection unit proper, but they may also double as piston rods for hydraulic actuators which advance and retract the plastification cylinder and/or hydraulic actuators which produce the injection stroke of the plastification screw.

At the end of the injection stroke, it is desirable to achieve a predetermined precise gap between the interior entry surface of the injector head of the plastification cylinder and a matching surface of a guided head portion on the forward extremity of the plastification screw. It is known that there exists an optimal gap size at which the ejector head and the guided head portion of the plastification screw are "self-cleaning," meaning that they will not develop deposits of raw material residue. This optimal or "self-cleaning" gap necessitates the adjustment of a precise optimal injection end position for each injection unit. On the other hand, the determination of this end position requires considerable experimentation, because it is influenced by a number of factors of which some are difficult to control: machining tolerances, dimensional changes resulting from heat treatment, uneven heat expansion due to temperature differences, etc. It follows that the optimal injection end position can only be approximated.

Adding to the difficulty of achieving such an optimal injection end position are recent developments in the field of injection molding technology which involves the processing of very abrasive plastic raw materials. In order to accommodate these materials, it has become necessary to improve the hardness and abrasion resistance of the plastification cylinders and plastification screws, with the result that allowance has to be made for wider dimensional discrepancies of these parts. Aside from these larger tolerances, it has become necessary to utilize longer plastification cylinders and plastification screws, especially in situations where the plastification cylinder is designed to allow for outgassing of the plastic raw materials. The longer units, in turn, require even larger tolerances and they are also more susceptible to heat expansion.

Lastly, it is an important consideration to minimize, or, whenever possible, to eliminate any reworking of the plastification elements after heat treatment, especially when the required physical characteristics necessitate surface treatment of the work pieces. Obviously, the reworking of the surface-treated plastification elements quickly reduces or eliminates their hardened surface layer, thereby correspondingly lowering the longevity of the parts.

In the face of these diverse influences which may account for a deviation of the injection end position from the earlier-mentioned optimal end position, it has already been suggested to provide an axial adjustability of the plastification cylinder relative to its carrier bridge, in order to make it possible to adjust a "self-cleaning" gap between the forward end position of the plastification screw and the injector head. These known adjustments involve the use of axial shims between the plastification cylinder and its carrier bridge.

The known position adjustment procedure of the plastification cylinder by means of axial shims is very time-consuming, as it becomes necessary to repeatedly remove the plastification cylinder, in order to determine empirically the adequacy of the end result of successive position adjustments on the plastification cylinder, in terms of their effect on the injection end position of the plastification screw. And, because it is virtually impossible to achieve a really precise optimal injection end position in this manner, and, because it is time-consuming even to achieve an approximation of this position, it is common practice to accept comparatively coarse approximations as the final adjustment.

The prior art in this field includes known adjustment devices for the continuous adjustment and clamping of tie rods. One such device is disclosed in U.S. Pat. No. 1,080,144 which suggests a threaded end portion on each tie rod carrying a threaded abutment collar in engagement with a pressure face of the plate to which the tie rod is to be attached. Traction bolts pull a clamping cap or similar clamping member against the extremity of the tie rod, thereby axially preloading the latter against the plate. The axial adjustability of the abutment collar on its tie rod is not an essential part of these clamping devices, being incidental in some of them and eliminated through position-setting abutment shoulders in others.

Another adjustment mechanism is disclosed in U.S. Pat. No. 4,105,390 which suggests a mechanism for the axial resetting of the distance between the stationary die carrier plate and the hydraulic actuator of an injection molding machine by means of clampable adjustment mechanisms which are associated with multiple tie rods and operated simultaneously by means of a connecting drive. Each adjustment mechanism includes a threaded adjustment sleeve on a threaded tie rod length portion. The clamping action is obtained by means of a clamping flange and clamping bolts which create an axial preload between the tie rod and the associated plate of the injection unit, via the adjustment sleeve.

Both above-described mechanisms are unsuitable for the longitudinal adjustment of the plastification cylinder of an injection unit, because they cannot accommodate the axially movable plastification screw and/or a single-thread clamping action.

SUMMARY OF THE INVENTION

Underlying the present invention is the inventor's finding, developed through detailed testing and observation, that a precise adjustment of the optimal injection end position will improve the consistency of quality of high-precision injection-molded parts of the kind which are needed in the optimal field, for example. It has been found, for example, that, when the injection end position of the cylindrical and tapered guide head of the plastification screw inside the matchingly shaped injector head deviates from the optimal end position, tiny amounts of plastic raw material residue tend to adhere to the injection channel. With the passage of time and, under the effect of high temperature and numerous successive injection cycles, these residue particles will change their physical characteristics and they may even become carbonized. This accumulation of impurities inside the injector head inevitably results in the release of some of the residue particles into the passing raw material stream, which particles then become incorporated in the injection-molded part as impurities.

Accordingly, it is an objective of the present invention to improve the known injection unit by giving it a continuous and very precise adjustability of the injection end position, which includes readjustability of that position at any time, and by providing this adjustability through simple, inexpensive adjustment means.

The present invention proposes to attain this objective by suggesting an improved injection unit in which the plastification cylinder is axially adjustable in relation to its carrier bridge by means of a threaded connection which produces continuous adjustment increments of any desired size and which can be clamped in place under a preload in any adjustment position.

In a preferred embodiment of the invention, the plastification cylinder is guided for longitudinal displacement in relation to its carrier bridge by means of a guide bore of the latter which embraces the outer diameter of the plastification cylinder. A rearwardly protruding end portion of the plastification cylinder is threaded and engaged by an adjustment nut, while a stationary thrust plate and a cooperating clamping sleeve engage the rear extremity of the plastification cylinder and exert a load against it, thereby clamping the plastification cylinder and its adjustment nut against the carrier bridge, under a forwardly oriented preload.

The present invention further suggests that the stationary thrust plate be in the form of an internally threaded square plate which is held at a fixed distance from the carrier bridge by means of tie bolts which are located near its four corners and radially outside the adjustment nut. The cooperating clamping sleeve is hollow, in order to accommodate the outer diameter of the plastification screw.

The adjustment mechanism of the present invention is not only reliable and easy to operate, it also tends to reduce the cost of the injection unit, because it makes possible a considerable relaxation of the machining tolerances which would otherwise be necessary on the plastification cylinder and plastification screw. In addition to making it possible to readily compensate for any dimensional variations, the invention also brings about considerable savings in assembly and adjustment time.

BRIEF DESCRIPTION OF THE DRAWINGS

Further special features and advantages of the invention will become apparent from the description following below, when taken together with the accompanying drawings which illustrate, by way of example, a preferred embodiment of the invention which is represented in the various figures as follows:

FIG. 1 is a plan view of an injection unit which incorporates an embodiment of the present invention;

FIG. 2 is an enlarged horizontal cross section through a portion of the injection unit of FIG. 1;

FIG. 2a is a similarly enlarged transverse cross section through the unit of FIG. 1, taken along line II—II thereof;

DESCRIPTION OF THE PREFERRED EMBODIMENT

Figure 3:
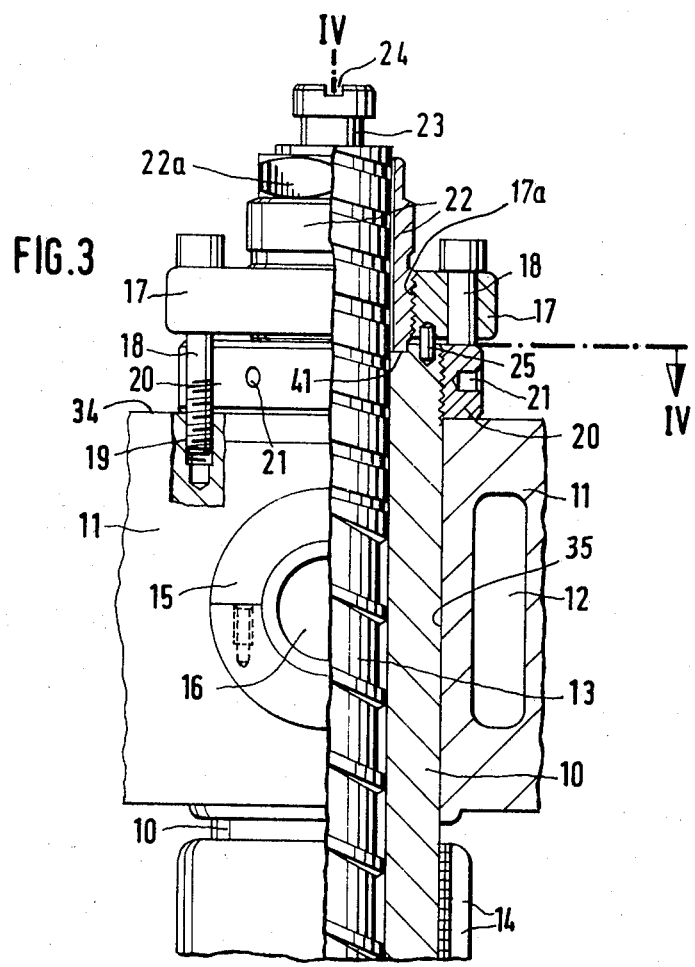
FIG. 3 is a further enlarged detail of the cross section of FIG. 2, showing particularly the adjustment mechanism of the invention.

Referring to FIGS. 1 and 2 of the drawing, it can be seen that the entire injection unit is carried on two parallel tie rods 26. The latter normally have their forward (or lower) extremities attached to the die closing unit (not shown) of an injection molding machine, while their rear (or upper) extremities are either unattached or supported on the machine frame by means of appropriate bracing members.

Centrally between the stationary tie rods 26 is arranged an elongated hollow plastification cylinder 10, and in the bore of the latter is arranged a matching plastification screw 13. The plastification cylinder 10 is supported near its rear extremity by means of a transverse carrier bridge 11 which rides on the tie rods 26, being longitudinally movable, in order to engage the injection unit against the die closing unit and retract it after an injection stroke. These movements are generated by the carrier bridge 11 itself which forms double-acting hydraulic cylinders in cooperation with two stationary pistons 36 which are seated on the two stationary tie rods 26.

Axially behind the carrier bridge 11 of the plastification cylinder 10 is arranged a second carrier bridge 28 for the plastification screw drive. The latter includes a rotational drive 29, whose power source is a hydraulic motor, and an axial drive which produces the injection stroke. The axial movements of the plastification screw are produced by means of two double-acting hydraulic cylinders which, as in the case of the carrier bridge 11, are formed by the carrier bridge 28. In this case, however, the stationary tie rods 26 do not serve as piston rods, but simply support and guide the carrier bridge 28. Instead, the carrier bridge 11 of the plastification cylinder has two hollow rearward extensions 30 which serve as piston rods and carry two injection pistons 37. Thus, a pressurization of the hydraulic actuators of the carrier bridge 28 causes the latter to move relative to the carrier bridge 11, thereby advancing or retracting the plastification screw 13 inside the plastification cylinder 10.

The relative axial position of the plastification screw 13 inside the plastification cylinder 10 is thus determined by the axial dimensions of the two carrier bridges 11 and 28 and their connecting hollow piston rods 30, as well as the plastification screw itself, its thrust support inside the carrier bridge 28, and its coupling, at 31. These various elements, once assembled, also determine the forward end position, i.e. the injection end position, of the plastification screw 13 inside the injector head 27 of the plastification cylinder 10. Obviously, even with very narrow manufacturing tolerances, their cumulative effect can lead to a considerable range of different injection end positions. The present invention therefore suggests a simple way of axially adjusting the position of the plastification cylinder 10 in relation to its carrier bridge 11. This adjustment mechanism will be described below, with reference to FIGS. 3 and 4 of the drawing.

The plastification cylinder 10 is a heavy-walled tubular member of which a major length portion is surrounded by heater jackets 14 and a rearward portion is slidingly fitted into a guide bore 35 of the carrier bridge 11. A short end portion of the plastification cylinder is threaded and protrudes rearwardly over a pressure face 34 of the carrier bridge 11. Engaging the threaded end portion of the plastification cylinder 10 is an annular adjustment nut 20 which bears against the rear pressure face 34, thereby serving as an adjustable axial abutment collar.

Figure 4:
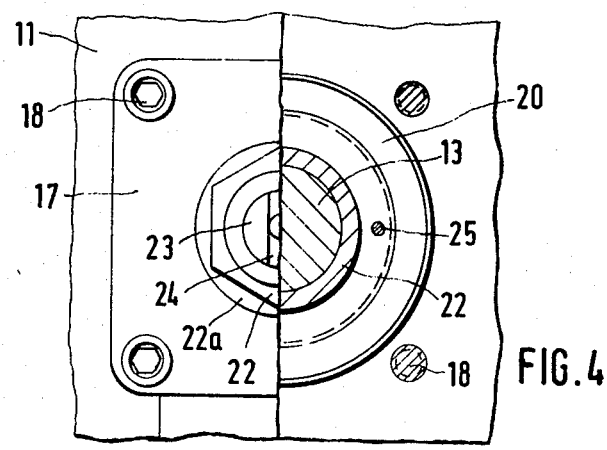
FIG. 4 is an end view and partial cross section along line IV—IV of FIG. 3.

Behind the rear extremity of the plastification cylinder 10 and its adjustment nut 20 is arranged a stationary thrust plate 17 of square outline (FIG. 4). The thrust plate 17 is rigidly connected to the carrier bridge 11 by means of four tie bolts 18 which engage threaded bores 19 of the carrier bridge 11. The tie bolts 18 reach axially past the rotatable adjustment nut 20 and must therefore be located radially outside the latter. This is conveniently accomplished by locating them near the four corners of the thrust plate 17. Following an initial adjustment of the four tie bolts 18 for the correct axial alignment of the threaded bore of the thrust plate 17, the tie bolts are preferably permanently secured against the threaded bores 19, using an adhesive, for example.

A threaded bore 17a of the thrust plate 17 is engaged by a matching threaded portion of a clamping sleeve 22. The latter extends concentrically with the plastification cylinder 11, having a bore which clears the outer diameter of the plastification screw 13. A rearward end portion of the clamping sleeve 22 carries hexagon facets 22a, for engagement by a clamping wrench. With a forwardly oriented pressure face 41, the clamping sleeve 22 engages the rearward extremity of the plastification cylinder 10, thereby exerting a forwardly directed preload against the latter. This axial preload is opposed by the abutment of the adjustment nut 20 against the rear pressure face 34 of the carrier bridge 11. An anti-rotation pin 25 which engages axial bores of the plastification cylinder 10 and of the thrust plate 17 prevents rotational displacements between these parts, while allowing for axial displacements of the plastification cylinder 10.

The clamping sleeve 22, in cooperation with the thrust plate 17, thus produces a rigid connection between the plastification cylinder and its carrier bridge 11, in any axial adjustment position of the plastification cylinder. However, this clamping preload is readily releasable, for rotational adjustment resettings of the adjustment nut 20 on the threaded end portion of the plastification cylinder 10.

During assembly of the injection unit, the plastification cylinder 10 is inserted into the guide bore 35 of the carrier bridge 11 to such a depth that the feed channel 16 of the plastification cylinder 10 is in alignment with the centering collar 15 of the carrier bridge. Engaging the centering collar is the lower extremity of a granulate feed chute (not shown) which connects the injection unit to a granulate supply hopper. Following insertion of the plastification cylinder 10 into the carrier bridge 11 the adjustment nut 20 is screwed on to its threaded rear end portion, until it just touches the pressure face 34 of the carrier bridge.

The plastification screw 13, which reaches axially through the plastification cylinder 10, is now connected to its rotary drive by means of a coupling socket 31 on the shaft of the drive unit which engages a coupling head 23 on the extremity of the plastification screw 13. In the coupling head 23 is further arranged a transverse groove 24 for a suitable safety drive key. The drive connection between the plastification screw 13 and its hydraulic rotary drive is free of axial clearance, so that the plastification screw forms a backlash-free movement unit with the carrier bridge 28 of the plastification screw drive.

The setting of the adjustment mechanism for the correct axial position of the plastification cylinder 10 in relation to its carrier bridge 11 requires a trial-and-error approach. Once the axial preload between the clamping sleeve 22 and the plastification cylinder 10 is released, the adjustment nut 20 can be rotated in either direction, using an appropriate tool which engages one or more of the radial bores 21 of the nut 20. The increments of forward or rearward adjustment to the position of the plastification cylinder can be of any desired size, and the adjustments can be repeated as often as necessary. Thus, it is possible to adjust an optimal injection end position of the plastification screw 13, in relation to the injector head 27 of the plastification cylinder 10 (FIG. 2), for the desired "self-cleaning" gap between the tapered extremity of the guide head portion 32 of the plastification screw 13 and a matching interior taper 39 of the injector head 27 of the plastification cylinder which leads into the injection channel 38 of the injector head 27. The latter is threaded into the forward extremity of the plastification cylinder 10 and can therefore be removed for inspection of the adjustment results, if necessary. In the injection end position, the guide head portion 32 of the plastification screw 13 cooperates with an annular back-flow barrier 33.

In the extreme case, the optimal injection end position of the plastification screw may involve actual contact between the guide head portion 32 and the interior taper 39 of the injector head 27.

Supporting the forward portion of the plastification cylinder is a cylinder centering bracket 40 which can be seen in FIGS. 1 and 2a. This centering bracket 40 consists of two identical cradle-shaped bracket halves 40a which are releasably clamped together by means of two clamping fasteners 43 and which are axially secured against the plastification cylinder 10 by means of two diametrally aligned centering pins 44. These pins also secure the plastification cylinder against rotation. The cylinder centering bracket 40 engages the two stationary tie rods 26 by means of suitable guide bushings 42 which thus position the forward extremity of the plastification cylinder, while executing the same axial movements on the tie rods 26 as the carrier bridge 11.

It should be understood, of course, that the foregoing disclosure described only a preferred embodiment of the invention and that it is intended to cover all changes and modifications of this example of the invention which fall within the scope of the appended claims.

I claim the following:

1. An improved injection unit which is adapted for use with an injection molding machine for plastic materials and which comprises an elongated tubular plastification cylinder defining a longitudinal axis for the unit, a plastification screw occupying the bore of said cylinder, including means for rotating the plastification screw in a plastification stroke and means for axially advancing the plastification screw in an injection stroke, and means for supporting and positioning the plastification cylinder, including a cylinder carrier member engaging the rear portion of the plastification cylinder, the improvement in said injection unit comprising:

means for adjusting the longitudinal position of the plastification cylinder in relation to said cylinder carrier member, in a continuous manner; and means for clamping the plastification cylinder to the cylinder carrier member in any adjustment position.

2. An injection unit as defined in claim 1, wherein the cylinder adjusting means includes:
an axial guide bore in the cylinder carrier member and a cooperating cylindrical outer surface on the plastification cylinder; and
an externally threaded rear end portion of the plastification cylinder and a cooperating internally threaded annular adjustment nut seated on the plastification cylinder and serving as an adjustable abutment collar for the latter, in cooperation with a pressure face on the rear side of the cylinder carrier member; and wherein
the cylinder clamping means is a means for axially preloading the plastification cylinder against the cylinder carrier member in the forward axial direction, thereby pressing the adjustment nut against said pressure face of the cylinder carrier member.

3. An injection unit as defined in claim 2, wherein the cylinder clamping means is a single axially oriented threaded clamping member.

4. An injection unit as defined in one of the preceding claims, wherein
the cylinder carrier member further includes a thrust plate which is attached thereto, at a distance from its rear side and behind the rearward extremity of the plastification cylinder, so as to extend transversely to the cylinder axis; and
the cylinder clamping means includes an externally threaded clamping sleeve which cooperates wth an internally threaded axial bore of the thrust plate, while concentrically surrounding the plastification screw, the clamping sleeve having a forwardly facing pressure face applying a clamping preload against the plastification cylinder, when it is screwed in the forward direction.

5. An injection unit as defined in claim 4, wherein the thrust plate is attached to the cylinder carrier member by means of a plurality of axially oriented tie bolts which engage threaded bores of the cylinder carrier member and are permanently secured against rotation.

6. An injection unit as defined in claim 4, wherein the thrust plate has a square outline, being attached to the cylinder carrier member by means of four axially oriented tie bolts which are arranged near the corners of the plate and engage threaded bores of the cylinder carrier member.

7. An injection unit as defined in claim 4, wherein the cylinder adjusting means includes means for blocking relative rotational displacements between the plastification cylinder and the cylinder carrier member, while permitting longitudinal adjustment displacements therebetween.

8. An injection unit as defined in claim 7, wherein the rotation blocking means is a pin which engages axially aligned bores in the plastification cylinder and in the thrust plate.

* * * * *